United States Patent
Chung

(10) Patent No.: US 9,978,092 B2
(45) Date of Patent: May 22, 2018

(54) INFORMATION PROCESSING DEVICE, INFORMATION PROCESSING METHOD, PROGRAM FOR INFORMATION PROCESSING DEVICE, AND RECORDING MEDIUM

(71) Applicant: Rakuten, Inc., Tokyo (JP)

(72) Inventor: YoungJoo Chung, Tokyo (JP)

(73) Assignee: Rakuten, Inc., Setagaya-ku (JP)

( * ) Notice: Subject to any disclaimer, the term of this patent is extended or adjusted under 35 U.S.C. 154(b) by 726 days.

(21) Appl. No.: 14/411,692

(22) PCT Filed: Aug. 28, 2013

(86) PCT No.: PCT/JP2013/073041
§ 371 (c)(1),
(2) Date: Dec. 29, 2014

(87) PCT Pub. No.: WO2015/029168
PCT Pub. Date: Mar. 5, 2015

(65) Prior Publication Data
US 2016/0232592 A1  Aug. 11, 2016

(51) Int. Cl.
*G06F 17/30* (2006.01)
*G06Q 30/06* (2012.01)
*G06Q 50/00* (2012.01)
*H04L 29/08* (2006.01)

(52) U.S. Cl.
CPC ..... *G06Q 30/0627* (2013.01); *G06F 17/3056* (2013.01); *G06F 17/30867* (2013.01); *G06F 17/30985* (2013.01); *G06Q 30/0601* (2013.01); *G06Q 50/01* (2013.01); *H04L 67/02* (2013.01)

(58) Field of Classification Search
CPC ............... G06F 17/30985; G06Q 30/0601
See application file for complete search history.

(56) References Cited

U.S. PATENT DOCUMENTS

| | | | |
|---|---|---|---|
| 9,014,713 B1* | 4/2015 | Shaw | G06Q 30/0267 455/412.1 |
| 2007/0073758 A1* | 3/2007 | Perry | G06F 17/30864 |
| 2012/0311056 A1* | 12/2012 | Masuko | G06Q 30/02 709/206 |

FOREIGN PATENT DOCUMENTS

JP    2004-272819 A    9/2004

* cited by examiner

*Primary Examiner* — Mahesh H Dwivedi
(74) *Attorney, Agent, or Firm* — Sughrue Mion, PLLC

(57) ABSTRACT

At least one pattern matching character string matching a predetermined pattern is extracted from target product information on a target product in a target store (S11, S12), the number of products in the target store of products hit in a range of product information on products sold in the target store is found, with each pattern matching character string as a search keyword, for each pattern matching character string (S13), and among the one or more pattern matching character strings, a pattern matching character string of which the number of products in the target store is the smallest is determined as a product specific character string for specifying the target product (S15).

9 Claims, 14 Drawing Sheets

| STORE ID | PRODUCT NAME | PRICE | PRODUCT EXPLANATION | PRODUCT PAGE INFORMATION | PRODUCT SPECIFIC CHARACTER STRING | SECOND PRODUCT SPECIFIC CHARACTER STRING | DIFFERENT CHARACTER STRING |
|---|---|---|---|---|---|---|---|
| ... | ... | ... | ... | ... | | | |
| : | : | : | : | : | JKD12-ZSB | | |
| : | : | : | : | : | DSA-55-AS | | |
| : | : | : | : | : | ABC-100 | ABC-100 BK | BK |
| : | : | : | : | : | ABC-100 | ABC-100 WH | WH |
| ... | ... | ... | ... | ... | | | |
| : | : | : | : | : | | | |
| : | : | : | : | : | | | |
| ... | ... | ... | ... | ... | | | |

FIG.3

| PRODUCT NAME | PRICE | PRODUCT EXPLANATION | PRODUCT PAGE RELATED INFORMATION |
|---|---|---|---|
| : : : | : : : | : : : | : : : |
| : : : | : : : | : : : | : : : |
| : : : | : : : | : : : | : : : |
| ... | ... | ... | ... |

FIG.6

```
<html>
<head>
. . . . . . . . . . . . . . . . . . . . . . . . . . . .
<title>○○SHOP・・・・・
. . . .
</title>
. . . . . . . . . . . . . . . . . . . . . . . . . . . .
</head>
<body>
. . . .
    ・・・・3 2 G B   FGHJK   microSDcard Class10
. . . . . . . . . .
    ・・・・・・・・01ZXC-REWQ
    ・・・・・・PRICE: ¥1,000 FREESHIPPING・・・・・・
. . . . . . . . . . . . . . .
    ・・・・・DE-WTD23 DEDICATED card・・・・・
. . . . . . . . . . . . . . .
. . . . . . . . . . . . . . .
. . . . . . .
</body>
</html>
```

FIG.10

INFORMATION PROCESSING DEVICE, INFORMATION PROCESSING METHOD, PROGRAM FOR INFORMATION PROCESSING DEVICE, AND RECORDING MEDIUM

CROSS REFERENCE TO RELATED APPLICATIONS

This application is a National Stage of International Application No. PCT/JP2013/073041 filed Aug. 28, 2013, the contents of which are incorporated herein by reference in their entirety.

TECHNICAL FIELD

The present invention relates to technical fields of information processing devices, information processing methods, programs for information processing devices, and storage media for finding a character string from information on a product.

BACKGROUND ART

On an electronic commerce (EC) site such as an online shopping mall on which a plurality of stores open stores, each store registers product information on products that the store wants to sell, such as pictures, explanations, prices, and others of the products on the EC site, thereby creating pages of the products. For example. Patent Document 1 discloses an online shopping management device that receives and acquires product display information (product guide page) with contents created according to a display form for an online shop from a real store side, and opens an online shop corresponding to the real store.

CITATION LIST

Patent Document

Patent Document 1: JP 2004-272819 A

SUMMARY OF THE INVENTION

Problem to be Solved by the Invention

However, for the contents of product information such as a product page or the like, in some cases, it is not determined what to be entered in what section, and each store can enter freely. In these cases, it is not easy to specify a character string (for example, a model number) for uniquely identifying a product from among product information entered.

The present invention has been made in view of this problem, and has an object of providing an information processing device and others for finding a character string for specifying a product from information on the product, as an example of the problem.

Means for Solving the Problem

In order to solve the above problem, the invention described in claim 1 includes: a character string extracting means that extracts at least one pattern matching character string matching a predetermined pattern from target product information on a target product in a target store; a searching in target store means that finds the number of products in the target store of products hit in a range of product information on products sold in the target store, with each pattern matching character string as a search keyword, for each pattern matching character string; and a product specific character string determining means that determines, among the one or more pattern matching character strings, a pattern matching character string of which the number of products in the target store is the smallest, as a product specific character string for specifying the target product.

Thus, the number of products in the target store is narrowed to the smallest from among the pattern matching character strings matching the predetermined pattern, so that the determined product specific character string is a character string with the highest specifying ability of specifying the target product in the target store.

In the information processing device described in claim 1, the invention described in claim 2 further includes a searching in store group means that finds the number of products in a store group to which the target store belongs, of products hit in a range of store group product information on products sold in the store group, with each pattern matching character string as a search keyword, for each pattern matching character string, wherein the product specific character string determining means determines, among the one or more pattern matching character strings, a pattern matching character string of which the number of products in the target store is the smallest, and the number of products in the store group is lower than or equal to a predetermined number, as the product specific character string.

In this case, the determined product specific character string, of which the number of products in the store group in the store group is lower than or equal to the predetermined number, is thus a character string that is not used relatively also in the other stores, and, as a unique character string, facilitates specifying the target product also in the store group, and has high suitability as a product specific character string. Thus, a product specific character string with a higher specifying precision in specifying a target product can be found.

In the information processing device described in claim 2, the invention described in claim 3 is characterized in that the product specific character string determining means determines, among the one or more pattern matching character strings, a pattern matching character string of which the number of products in the target store is the smallest, the number of products in the store group is the smallest, and the number of products in the store group is lower than or equal to the predetermined number, as the product specific character string.

In this case, the condition that the number of products in the store group be the smallest further improves the specifying precision in specifying the target product.

In the information processing device described in claim 2 or 3, the invention described in claim 4 is characterized in that the predetermined number is a predetermine number in accordance with an aspect of the store group.

In this case, the predetermined number is determined in accordance with the aspect of the store group, so that it becomes a predetermined number appropriate for the aspect of the store group, resulting in a further improved specifying precision in specifying a target product.

In the information processing device described in any one of claims 2 to 4, the invention described in claim 5 is characterized in that: the store group forms a store group in a level of a plurality of levels having a hierarchical structure; the searching in store group means finds the number of products in a store group corresponding to a store group in each level for each pattern matching character string; and the product specific character string determining means determines a pattern matching character string of which the number of products in a store group in an upper level and the number of products in a store group in a lower level in the store groups in the respective levels meet a predetermined condition, as the product specific character string.

In this case, limitations are imposed such that the number of products in a store group in an upper level and the number of products in a store group in a lower level in store groups in respective levels satisfy the predetermined condition, so that the specifying precision in specifying the target product is further improved.

In the information processing device described in any one of claims 1 to 5, the invention described in claim 6 further includes: a different character string extracting means that extracts different character strings different from each other between target product information pieces on target products corresponding to the product specific character string determined by the product specific character string determining means when the number of products in the target store is two or more on the product specific character string; a combined-character string generating means that generates a combined-character string in which the product specific character string of which the number of products in the target store is two or more is combined with the different character strings; a searching combined-character string in target store means that finds the number of products in the target store, with the generated combined-character string as a search keyword; and a second product specific character string determining means that determines the combined-character string as a second product specific character string for specifying the target product when the number of products in the target store by the searching combined-character string in target store means is one.

In this case, when there is a similar product specific character string, a second product specific character string improved in specifying precision in specifying the target product more than the product specific character string can be obtained. Moreover, even when there are fluctuations in expression or typos, a second product specific character string in which the fluctuations in expression or typos are cancelled can be obtained.

In the information processing device described in claim 6, the invention described in claim 7 further includes: a search keyword acquiring means that acquires a search keyword from a terminal device; a webpage generating means that generates a webpage on which the different character strings are displayed in a selectable manner to perform a search by the second product specific character string when the acquired search keyword is the product specific character string of which the number of products in the target store is two or more; a transmitting means that transmits the webpage to the terminal device; a selected information acquiring means that acquires information on what a different character string is selected, from the terminal device; and a search result transmitting means that, when the different character string is selected, transmits search results searched out by the second product specific character string including the selected different character string to the terminal device.

In this case, the different character strings are displayed in a selectable manner so that a user can further narrow down products by the second product specific character string for a search, and a search is performed by the second product specific character string including the selected different character string, so that the user can make a search without entering a model number or the like in detail, and user convenience is improved.

The invention described in claim 8 includes: a character string extracting step in which a character string extracting means extracts at least one pattern matching character string matching a predetermined pattern from target product information on a target product in a target store; a searching in target store step in which a searching in target store means finds the number of products in the target store of products hit in a range of product information on products sold in the target store, with each pattern matching character string as a search keyword, for each pattern matching character string; and a product specific character string determining step in which a product specific character string determining means determines, among the one or more pattern matching character strings, a pattern matching character string of which the number of products in the target store is the smallest, as a product specific character string for specifying the target product.

The invention described in claim 9 causes a computer to function as: a character string extracting means that extracts at least one pattern matching character string matching a predetermined pattern from target product information on a target product in a target store; a searching in target store means that finds the number of products in the target store of products hit in a range of product information on products sold in the target store, with each pattern matching character string as a search keyword, for each pattern matching character string; and a product specific character string determining means that determines, among the one or more pattern matching character strings, a pattern matching character string of which the number of products in the target store is the smallest, as a product specific character string for specifying the target product.

In the invention described in claim 10, a program for an information processing device is computer-readably recorded, the program causing a computer to function as: a character string extracting means that extracts at least one pattern matching character string matching a predetermined pattern from target product information on a target product in a target store; a searching in target store means that finds the number of products in the target store of products hit in a range of product information on products sold in the target store, with each pattern matching character string as a search keyword, for each pattern matching character string; and a product specific character string determining means that determines, among the one or more pattern matching character strings, a pattern matching character string of which the number of products in the target store is the smallest, as a product specific character string for specifying the target product.

Effect of the Invention

According to the present invention, a character string for specifying a product can be found from information on the product.

BRIEF DESCRIPTION OF THE DRAWINGS

FIG. 3 is a schematic diagram illustrating an example of data stored in a product information database in FIG. 2.

FIG. 6 is a schematic diagram illustrating an example of product information created on the store side for product registration.

FIG. 10 is a schematic diagram illustrating an example of product information on a target product.

MODES FOR CARRYING OUT THE INVENTION

Hereinafter, an embodiment of the present invention will be described with reference to the drawings. The embodiment described below is an embodiment in which the present invention is applied to an information processing system.

1. Configuration and Function Outline of Information Processing System

First, a configuration and general functions of an information processing system according to an embodiment of the present invention will be described with reference to FIG. 1.

Figure 1:
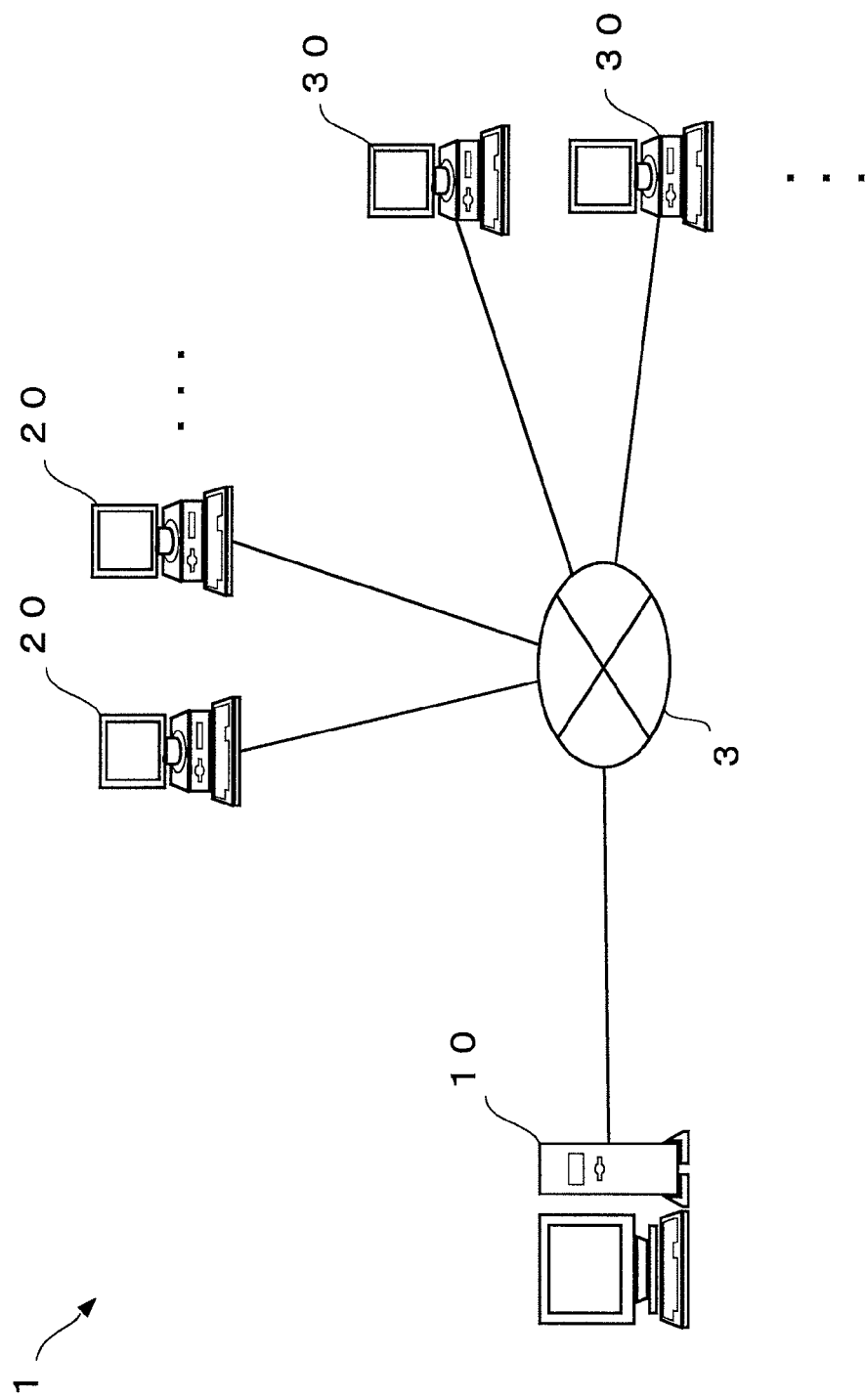
FIG. 1 is a schematic diagram illustrating an example of a general configuration of an information processing system according to an embodiment of the present invention.

FIG. 1 is a schematic diagram illustrating an example of a general configuration of an information processing system 1 according to this embodiment.

As shown in FIG. 1, the information processing system 1 includes an information processing server 10 (an example of an information processing device) installed for operating a shopping site, store terminal devices 20 in stores that offer products to the shopping site, and user terminal devices 30 of users who do shopping on the shopping site.

The information processing server 10, the store terminal devices 20, and the user terminal devices 30 can transmit and receive data to and from each other via a network 3, using, for example, TCP/IP or the like as a communication protocol. The network 3 is constructed by, for example, the Internet, a dedicated communication line (for example, a Community Antenna Television (CATV) line), a mobile communication network (including base stations and others), a gateway, and others.

The information processing server 10 is a computer of the shopping site constituting an electronic mall.

The store terminal devices 20 are computers of sellers who offer products to the shopping site. The store terminal devices 20 have a web browser function, and display a screen for receiving product information on products sold, or the like. The sellers register products they carry on the store terminal devices 20.

The store terminal devices 20 form store groups in accordance with categories of products they sell, store locations, product sales rankings, or others. Incidentally, the store groups may be store groups in the entire shopping site, or may be store groups including stores outside the shopping site. The store groups including stores outside the shopping site may be store groups on the Internet in Japan, store groups on the Internet in Asia, or store groups on the Internet worldwide, for example. Further, they may be store groups of stores selling products in the same categories on the Internet in Japan.

The user terminal devices 30 are computers of users who purchase products on the shopping site. The user terminal devices 30 have a web browser function, and display a product search on a screen.

2. Configuration and Function of Information Processing Server and Each Terminal Device

2.1 Configuration and Function of Information Processing Server 10

Next, a configuration and functions of the information processing server 10 will be described with reference to FIGS. 2 to 4.

Figure 2:
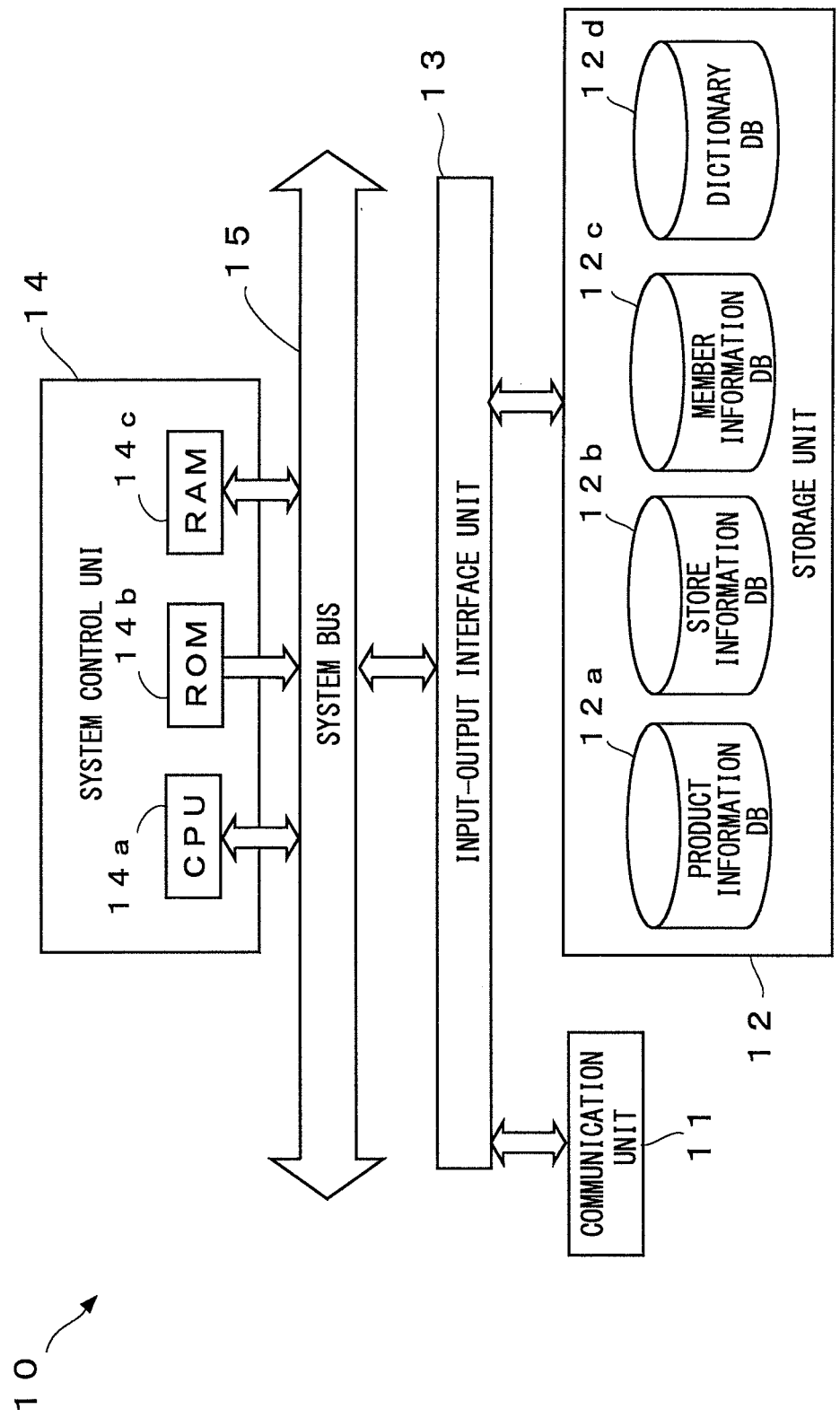
FIG. 2 is a block diagram illustrating an example of a general configuration of an information processing server in FIG. 1.

FIG. 2 is a block diagram illustrating an example of a general configuration of the information processing server 10. FIG. 3 is a schematic diagram illustrating an example of data stored in a product information database.

As shown in FIG. 2, the information processing server 10 includes a communication unit 11, a storage unit 12, an input-output interface unit 13, and a system control unit 14. The system control unit 14 and the input-output interface unit 13 are connected via a system bus 15.

The communication unit 11 connects to the network 3 to control the state of communication with the store terminal devices 20 and the user terminal devices 30.

The storage unit 12 (an example of storage means) is constituted by, for example, a hard disk drive or the like, and stores various programs such as an operating system and a server program, files of webpages written in a markup language such as HTML or the like, and others. Incidentally, the various programs may be obtained from other server devices or the like via the network 3, or may be recorded in a recording medium and read via a drive device, for example.

In the storage unit 12, a product information database 12a (hereinafter referred to as "product information DB 12a"), a store information database 12b (hereinafter referred to as "store information DB 12b"), a member information database 12c (hereinafter referred to as "member information DB 12c"), a dictionary database 12d (hereinafter referred to as "dictionary DB 12d"), and so on are constructed.

In the product information DB 12a, as shown in FIG. 3, in association with store IDs, which are identifiers for identifying stores, product names, prices, product explanations, product page information, product specific character strings for specifying products, and others are stored. Also, in the product information DB 12a, second product specific character strings, different character strings included in the second product specific character strings, and others are stored. Further, in the product information DB 12*a*, in association with the store IDs, images of products, shipping information, specs, and others are stored. Incidentally, for a product for which a specific character string is not determined, its specific character string box is blank. For a product for which a second specific character string is not determined, or a product for which a second specific character string does not exist, its second specific character string box is blank.

Here, the product specific character strings include model numbers for uniquely identifying products, codes, product names, model names, type names, uniquely-assigned character strings, and the like. The product explanations include product titles that briefly explain the products, and others. The product page information includes files of product webpages written in a markup language such as HTML or XML, or the like, Uniform Resource Locators (URLs) indicating storage locations of files of product webpages, or the like.

In the product information DB 12*a*, files of product webpages of each product are assigned with unique URLs and stored.

Also, in the product information DB 12*a*, a database for search is constructed so that products can be searched for by search keywords. In particular, an index for search is formed for each record in the product information DB 12*a* as shown in FIG. 3 so that the number of products sold in the shopping site or in the stores can be found from the number of hits. Further, a database for search is constructed in association with store IDs, category IDs indicating the categories of the stores, or the like so that the scope of search can be changed in the shopping site.

In the store information DB 12*b*, store information such as store IDs of stores, category IDs indicating the categories of the stores, store explanations, names of the stores, addresses, telephone numbers, and product information on products sold is registered.

In the member information DB 12*c*, user information such as user IDs, names, addresses, telephone numbers, e-mail addresses, occupations, hobbies, and purchase histories of users (users of the shopping site) registered as members, and subjects and categories of interest to the users is registered. Also, in the member information DB 12*c*, user IDs, login IDs, and passwords, which are necessary for users to log in the shopping site from the user terminal devices 30, are registered. Here, the login IDs and the passwords are login information used for login processing (user authentication processing).

In the dictionary DB 12*d*, units such as "GB", "BYTE", and "pcs", brand names, company names, given character strings such as "dedicated", "attached", and "free shipping", synonyms, and others are stored.

Here, the units, the brand names, and the like are information for filtering pattern matching character strings when pattern matching character strings matching a predetermined pattern are extracted from target product information on a target product in a target store. The character strings "dedicated" and "attached" are information for excluding character strings indicating an attachment to a target product and a parent product to which a target product is attached, that is, character strings indicating products which are not in the same layer as that of a target product in a product category.

A pattern matching character string matching a predetermined pattern is extracted by a regular expression expressing a set of character strings in a single character string, a morphological analysis, or the like.

2.2 Configuration and Function of Store Terminal Device 20

Next, a configuration and functions of the store terminal devices 20 will be described with reference to FIG. 4.

Figure 4:
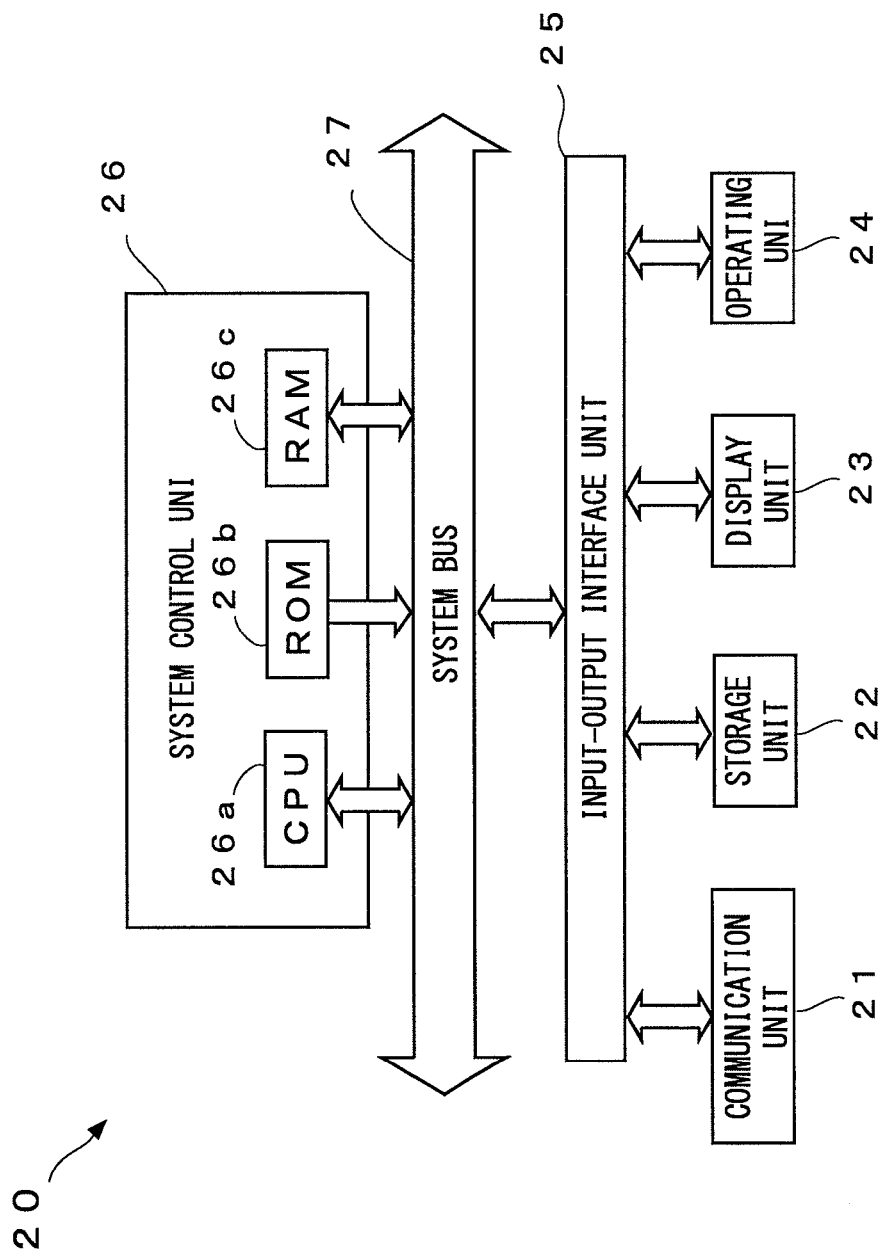
FIG. 4 is a block diagram illustrating an example of a general configuration of a store terminal device in FIG. 1.

FIG. 4 is a block diagram illustrating an example of a general configuration of each store terminal device 20.

As shown in FIG. 4, the store terminal device 20 serving as a computer is a personal computer, a mobile wireless phone such as a smartphone, or a mobile terminal such as a PDA, for example, and includes a communication unit 21, a storage unit 22, a display unit 23, an operating unit 24, an input-output interface unit 25, and a system control unit 26. The system control unit 26 and the input-output interface unit 25 are connected via a system bus 27.

The communication unit 21 controls communications with the information processing server 10 and others through the network 3. Incidentally, when the store terminal device 20 is a mobile terminal device, the communication unit 21 has a wireless communication function for connecting to the mobile communication network in the network 3.

The storage unit 22 is formed by a hard disk drive, for example, and stores an operating system, a program for a web browser, a program for a tool bar for a web browser, and so on.

The display unit 23 (an example of a display means) is constituted by a liquid crystal display element, an electro luminescence (EL) element, or the like, for example. On the display unit 23, a webpage for receiving product information is displayed by the web browser.

The operating unit 24 is composed of a key board and a mouse, or the like, for example. A user enters a response through the operating unit 24. Incidentally, when the display unit 23 is a display panel in a touch switch type such as a touch panel, the operating unit 24 acquires information on a location on the display unit 23 touched or approached by the user.

The input-output interface unit 25 is an interface between the communication unit 21 and the storage unit 22 and the system control unit 26.

The system control unit 26 includes a CPU 26*a*, a ROM 26*b*, and a RAM 26*c*, for example. In the system control unit 26, the CPU 26*a* reads and executes various programs stored in the ROM 26*b*, the RAM 26*c*, and the storage unit 22. For example, the system control unit 26 functions as a web browser, executing the program for the web browser.

2.3 Configuration and Function of User Terminal Device 30

Next, a configuration and functions of the user terminal devices 30 will be described with reference to FIG. 5.

Figure 5:
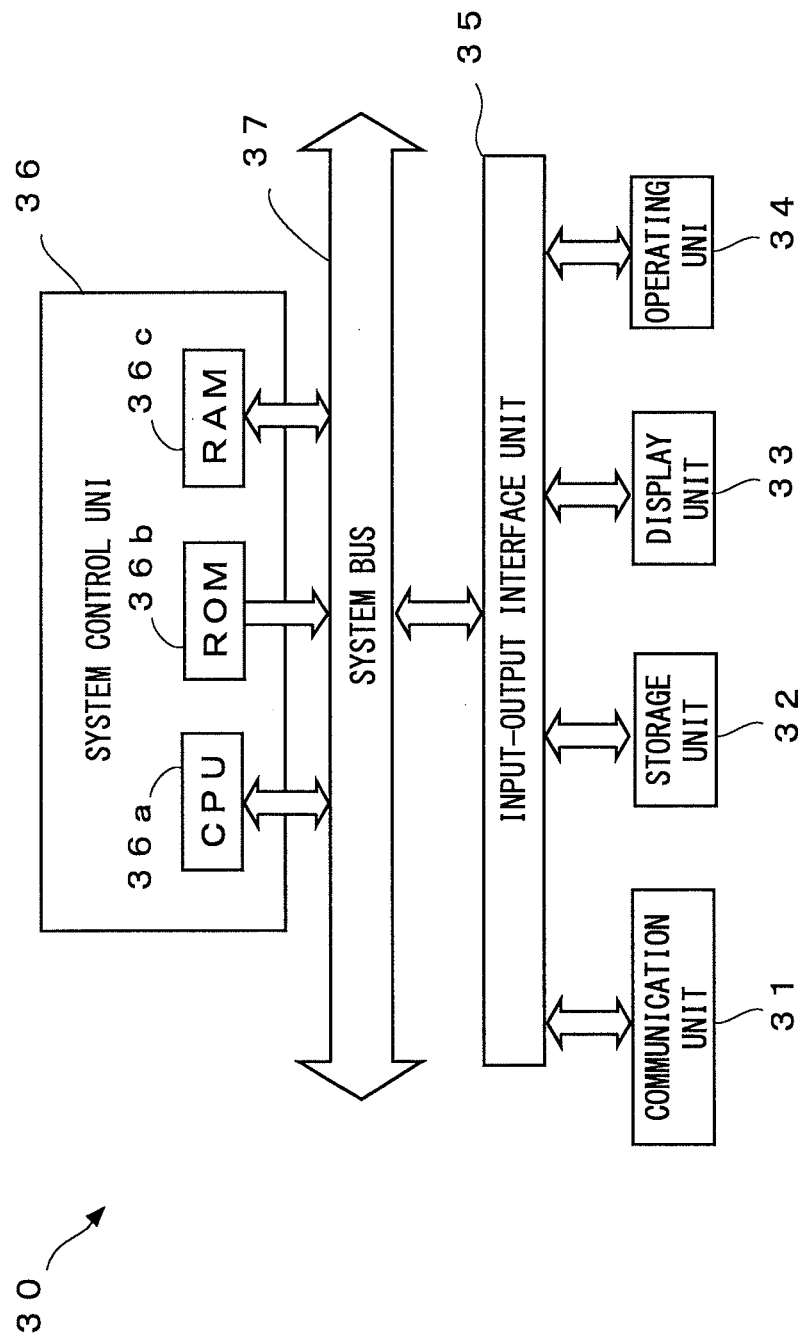
FIG. 5 is a block diagram illustrating an example of a general configuration of a user terminal device in FIG. 1.

FIG. 5 is a block diagram illustrating an example of a general configuration of each user terminal device 30.

As shown in FIG. 5, the user terminal device 30 serving as a computer is, like the store terminal device 20, a personal computer, a mobile wireless phone such as a smartphone, or a mobile terminal such as a PDA, for example, and includes a communication unit 31, a storage unit 32, a display unit 33, an operating unit 34, an input-output interface unit 35, and a system control unit 36. The system control unit 36 and the input-output interface unit 35 are connected via a system bus 37. Incidentally, the configuration and functions of the user terminal devices 30 are almost identical to the configuration and functions of the store terminal devices 20, and will not be described in detail.

Incidentally, on the display unit 33, a webpage of search results or the like is displayed by a web browser.

3. Operation of Information Processing System

Next, an operation of the information processing system 1 according to an embodiment of the present invention will be described with reference to the drawings.

3.1 Operation Example of Receiving Product Information on Information Processing Server First, an operation example of receiving product information on the information processing server will be described with reference to FIGS. 6 to 8.

FIG. 6 is a schematic diagram illustrating an example of product information created on the store side for product registration. FIG. 7 is a flowchart showing an operation example of receiving product information in the information processing server 10. FIG. 8 is a schematic diagram illustrating a screen example of product information reception displayed on the store terminal devices.

First, a product webpage of each product to be registered is prepared in advance by webpage creation software or the like, and stored in the storage unit 22 of the store terminal device 20.

When products are registered, on the store terminal device 20, product information on a plurality of products carried by the store is entered, using spreadsheet software or the like as shown in FIG. 6, and a product information file such as in comma separated values (CSV) format is stored. For example, product names, prices, product explanations, product page related information, product images, shipping information, and others are entered. For example, in the product page related information, information showing a location for storing a file of a product webpage is shown, and a link is posted thereto. Information on product webpages may be uploaded to the information processing server 10 at the time of reception of the product information file, or may be uploaded in advance to the information processing server 10.

The store terminal devices 20 request a product information reception page for registering product information on the information processing server 10.

Figure 7:
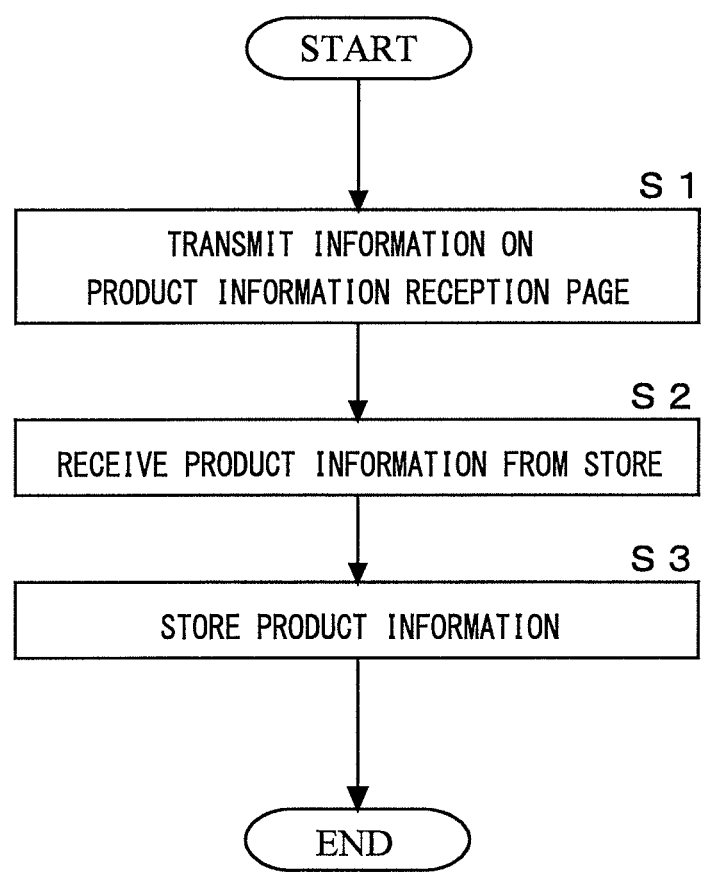
FIG. 7 is a flowchart showing an example of an operation of receiving product information on the information processing server in FIG. 1.

As shown in FIG. 7, the information processing server 10 transmits information on the product information reception page (step S1). Specifically, when receiving a product information reception page request, the system control unit 14 of the information processing server 10 transmits information on the product information reception page to the store terminal device 20 that has requested it.

Figure 8:
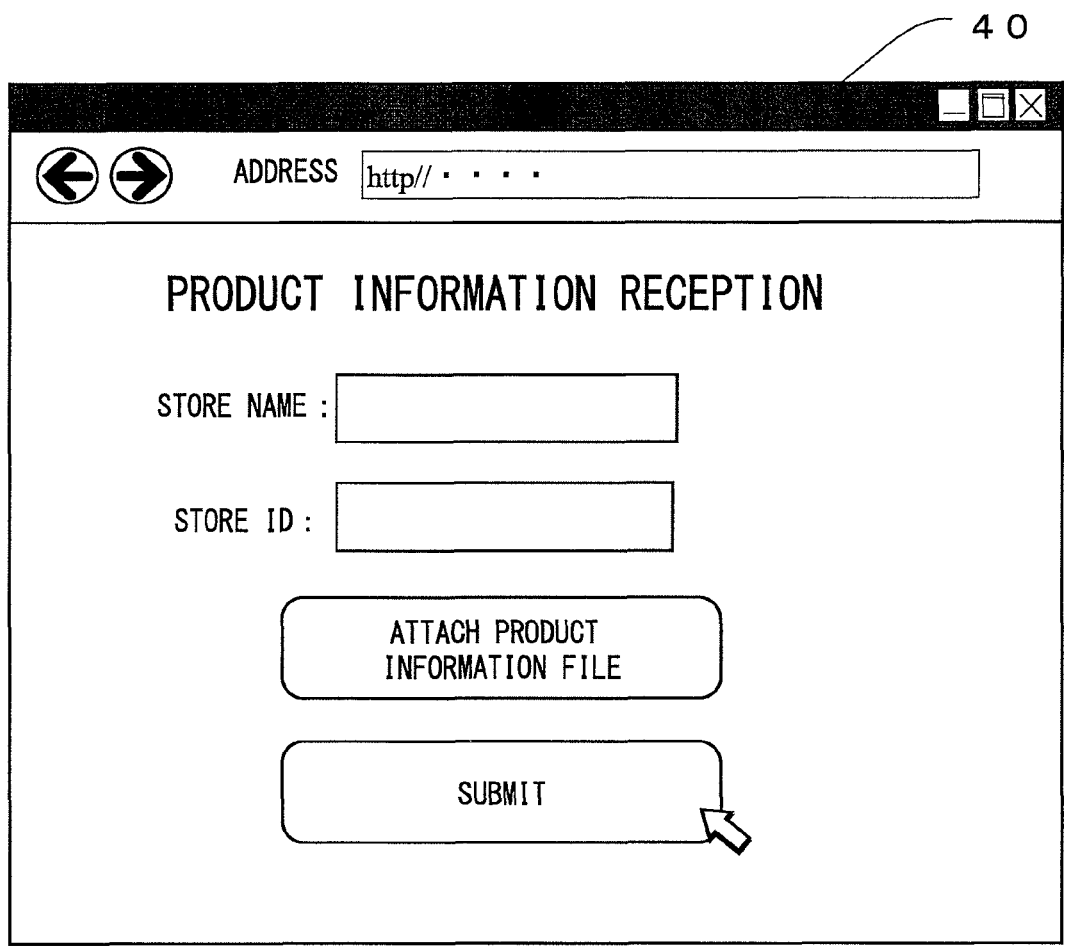
FIG. 8 is a schematic diagram illustrating an example of a screen of product information reception displayed on a store terminal device in FIG. 1.

Then, as shown in FIG. 8, the store terminal device 20 displays a product information reception page 40 on the display unit 23. Then, on the store side, the store name and the store ID are entered on the product information reception page 40. An attach product information file button on the product information reception page 40 is selected, and a location for storing a product information file in which product information on products is entered is specified. When the specification of the product information file is completed, a submit button on the product information reception page 40 is selected, and the store terminal device 20 transmits the product information file together with the store name and the store ID to the information processing server 10.

Incidentally, the store terminal device 20 may transmit a file of a product webpage corresponding to each product to be registered in the product information file to the information processing server 10, based on information on a location for storing the file of the product webpage in the product page related information in the product information file. When information on a product webpage is previously uploaded to the information processing server 10, the product page related information may be a URL or the like indicating information on the product webpage. Instead of transmitting product information on a plurality of products by a product information file on the store side, product information (including a file of a product webpage) on each product may be registered in the information processing server 10 in association with a store ID. The information processing server 10 may automatically generate a product webpage, based on product information received from a store.

Next, the information processing server 10 receives product information from the store (step S2). Specifically, the system control unit 14 receives the product information file together with the store name and the store ID from the store terminal device 20.

Next, the information processing server 10 stores the product information (step S3). Specifically, based on the received product information file, the system control unit 14 stores the product information for each product in association with the store ID in the product information DB 12a.

3.2 Operation Example of Generating Product Specific Character String in Information Processing Server Next, an operation example of generating a product specific character string on the information processing server will be described with reference to FIGS. 8 to 11.

Figure 9:
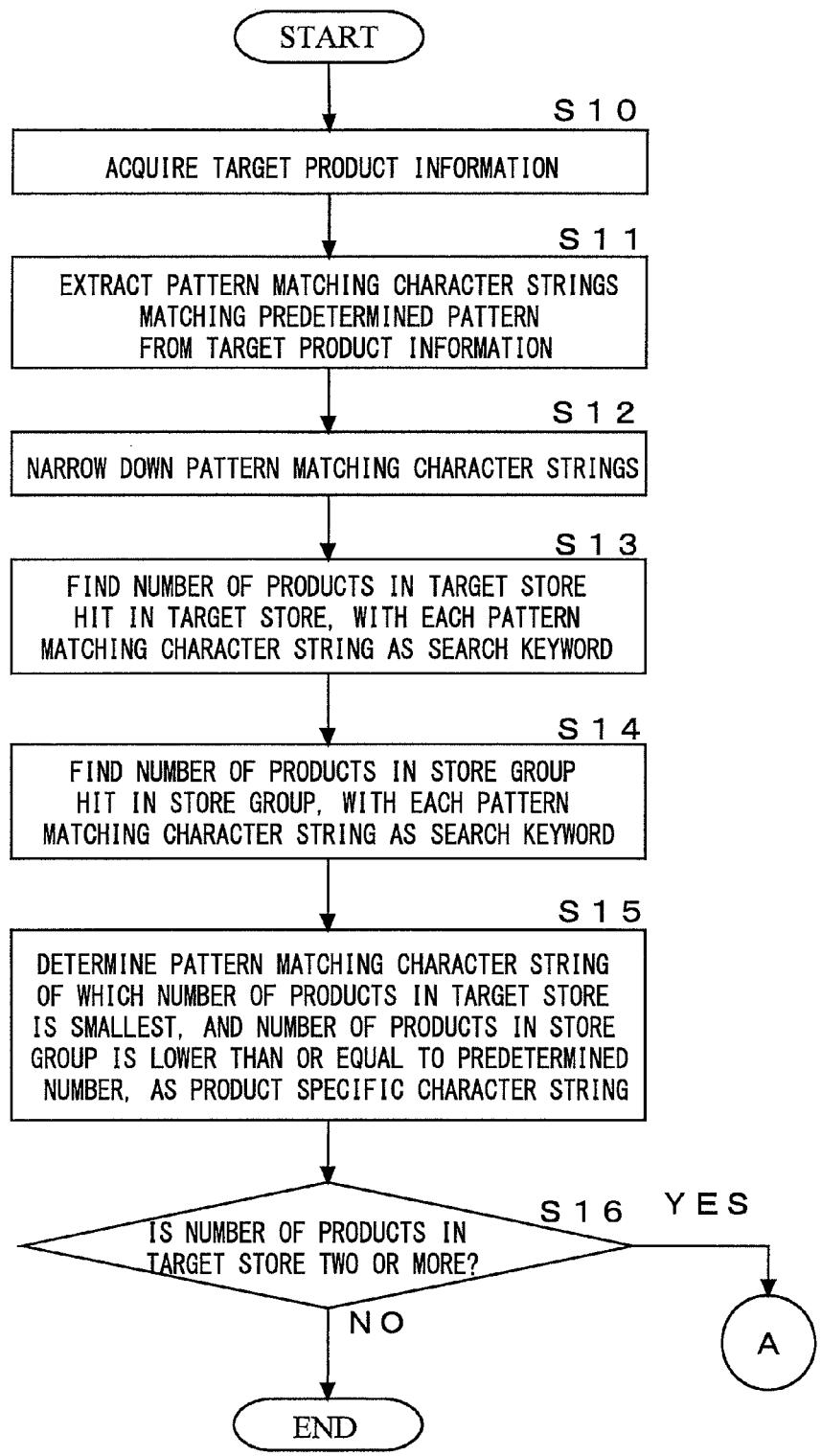
FIG. 9 is a flowchart showing an example of an operation of generating a product specific character string on the information processing server in FIG. 1.
Figure 11:
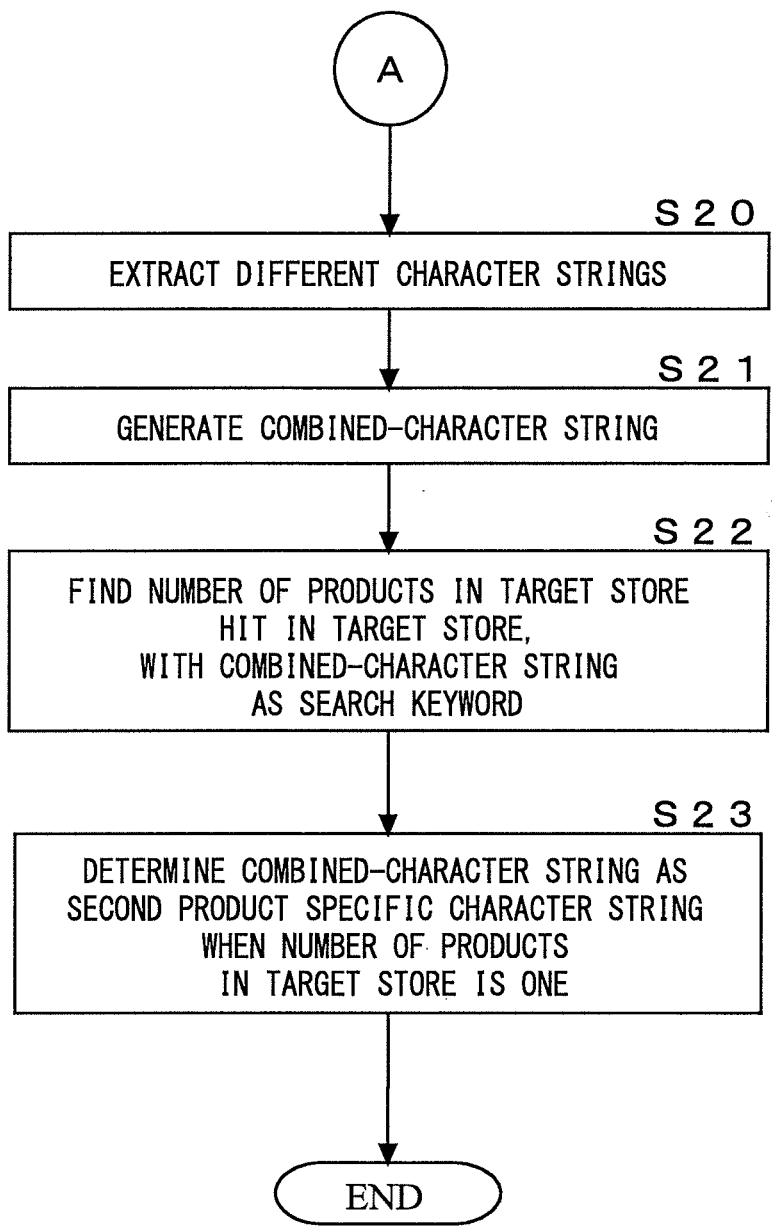
FIG. 11 is a flowchart showing an example of an operation of generating a second product specific character string on the information processing server in FIG. 1.

FIG. 8 is a schematic diagram illustrating a screen example of product information reception displayed on the store terminal device 20. FIG. 9 is a flowchart showing an operation example of generating a product specific character string on the information processing server 10. FIG. 10 is a schematic diagram illustrating an example of product information on a target product. FIG. 11 is a flowchart showing an operation example of generating a second product specific character string on the information processing server 10.

First, at predetermined times, in order to generate a product specific character string for specifying a product, an operation of generating a product specific character string on the information processing server 10 is performed.

For example, when a predetermined time has come, such as every other day, or every other week, with reference to the product information DB 12a, an operation of generating a product specific character string is performed for a product for which a product specific character string is not determined.

As shown in FIG. 9, the information processing server 10 acquires target product information on a target product (step S10). Specifically, referring to the product information DB 12a, the system control unit 14 of the information processing server 10 selects one of products for which a product specific character string is not determined as a target product for which a product specific character string is to be determined. That is, one record in the product information DB 12a in which a product specific character string is not determined is selected. Product information on the selected record becomes target product information on a target product, and the store ID becomes the store ID of a target store.

Then, referring to the product page information in the product information DB 12*a*, the system control unit 14 acquires the target product information on the target product. For example, as shown in FIG. 10, the system control unit 14 acquires product webpage information (HTML file) on the target product as target product information. Incidentally, the system control unit 14 may acquire a portion of the product explanation (including the product title) in the product information DB 12*a* as target product information.

Next, the information processing server 10 extracts a pattern matching character string matching a predetermined pattern from the target product information (step S11). Specifically, the system control unit 14 of the information processing server 10 extracts, from the product webpage information, a character string with characters more than or equal to a predetermined number among character strings separated by a space, by a pattern expressed in a regular expression, which is an example of the predetermined pattern. For example, as pattern matching character strings, "32 GB", "FGHJK", "microSDcard", "Class10", "01ZXC-REWQ", "price\1,000", "freeshipping", "DE-WTD23 dedicated card" are extracted.

In this manner, the information processing server 10 functions as an example of a character string extracting means that extracts at least one pattern matching character string matching a predetermined pattern from target product information on a target product in a target store.

Next, the information processing server 10 narrows down the pattern matching character strings (step S12). Specifically, referring to the dictionary DB 12*d*, the system control unit 14 extrudes a character string including a unit, a character string including a predetermined character string, and a character string including a brand name or a company name to narrow down the pattern matching character strings. For example, they are narrowed down to "microSDcard", "Class10", and "01ZXC-REWQ", for example. Incidentally, "FGHJK" is a brand name or a company name.

In this manner, the information processing server 10 functions as an example of a character string extracting means that extracts at least one pattern matching character string matching a predetermined pattern from target product information on a target product in a target store.

Next, the information processing server 10 finds the number of products in the target store hit in the target store with each pattern matching character string as a search keyword (step S13). Specifically, referring to the product information DB 12*a*, the system control unit 14 finds the number of products in the target store of products hit in the target store, based on the store ID of the target product, with each of the narrowed down matching character strings as a search keyword.

The number of products in the target store is found by counting the number of hits by a search keyword in the products sold in the target store (specified by the store ID in the product information DB 12*a* as shown in FIG. 3) by each record in the product information DB 12*a* (by each product information on the product in a record). That is, the number of products in the target store is the number of hits of products hit in a range of the product information on the products sold in the target store.

For example, as the number of hits is 134 for the pattern matching character string "microSDcard", the number of hits is 102 for the pattern matching character string "Class10", and the number of hits is 1 for the pattern matching character string "01ZXC-REWQ", the number of products in the target store of each pattern matching character string is found.

Incidentally, when product information on a product is a product title, unlike in product page information, the possibility that a plurality of model numbers is used is low, so that an appropriate number of products in a target store can be found.

In this manner, the information processing server 10 functions as an example of a searching in target store means that finds the number of products in a target store of products hit in a range of product information on products sold in the target store with each pattern matching character strings as a search keyword for each pattern matching character string.

Next, the information processing server 10 finds the number of products in a store group hit in the store group with each of the pattern matching character strings as a search keyword (step S14). Specifically, referring to the product information DB 12*a*, the system control unit 14 finds the number of products in the store group of products hit in the entire shopping site (an example of a store group to which the target store belongs) with each of the narrowed down matching character strings as a search keyword.

The number of products in the store group is found by counting the number of hits by a search keyword in products sold in the store group to which the target store belongs by each record in the product information DB 12*a* (by each product information on the product in a record). That is, the number of products in the store group is the number of products hit in a range of store group product information on the products sold in the store group to which the target store belongs.

For example, as the number of hits is 37,553 for the pattern matching character string "microSDcard", the number of hits is 20,436 for the pattern matching character string "Class10", and the number of hits is 51 for the pattern matching character string "01ZXC-REWQ", the number of products in the store group of each pattern matching character string is found.

In this manner, the information processing server 10 functions as an example of a searching in store group means that finds the number of products in a store group of products hit in a range of store group product information on products sold in the store group to which the target store belongs, with each of the pattern matching character strings as a search keyword, for each pattern matching character string.

Next, the information processing server 10 determines a pattern matching character string of which the number of products in the target store is the smallest, and the number of products in the store group is lower than or equal to a predetermined number, as a product specific character string (step S15). For example, among the three pattern matching character strings, the pattern matching character string "01ZXC-REWQ" of which the number of products in the target store is 51, which is the smallest, and the number of products in the store group is 51, that is, the number of products in the store group is lower than or equal to a predetermined number (for example, 100), is determined as a product specific character string. Then, the information processing server 10 stores the determined product specific character string in the product information DB 12*a*. That is, the information processing server 10 registers the determined product specific character string in a blank product specific character string box.

Here, in step S15, the information processing server 10 may determine a pattern matching character string of which the number of products in the target store is the smallest, as a product specific character string. The determined product specific character string is highly likely to be a unique character string corresponding to a product webpage of the target product at least in the target store.

Incidentally, even though the number of products in the target store of the pattern matching character string "01ZXC-REWQ" is the smallest, when the number of products in the store group is 120, which is larger than the predetermined number, the pattern matching character string "01ZXC-REWQ" has a weak ability of specifying the product in the shopping site, and is not determined as a product specific character string in some cases.

For example, assume that for products of a series such as products in different colors or products in different volumes, the target store sells only a single product in the products of the series, and other stores sell various products such as in different volumes. Further, suppose that the target store uses, for example, the character string "01ZXC-REWQ" for a model number of the carried product, and the other stores use the character string "01ZXC-REWQ 2 GB", the character string "01ZXC-REWQ 4 GB", the character string "01ZXC-REWQ 8 GB", the character string "01ZXC-REWQ 16 GB", and so on for the products of the series. In this case, even when for the product specific character string "01ZXC-REWQ" determined in the target store, the number of products in the target store is the smallest, the number of products in the store group becomes a large value. Therefore, its ability of specifying the product can be weak in the shopping site.

In such a case, since the number of products in the store group is highly likely to be larger than the number of stores in the store group, the predetermined number may be determined based on the number of stores in the store group. For example, a number one time, one and a half times, two times, or some times the number of stores in the store group is set as the predetermined number.

In this manner, the information processing server 10 functions as an example of a product specific character string determining means that determines the pattern matching character string of which the number of products in the target store is the smallest among the one or more pattern matching character strings, as a product specific character string for specifying the target product. Further, the information processing server 10 functions as an example of a product specific character string determining means that determines the pattern matching character string of which the number of products in the target store is the smallest and the number of products in the store group is lower than or equal to the predetermined number among the one or more pattern matching character strings, as the product specific character string.

Furthermore, the information processing server 10 may add a condition that the number of products in the store group be the smallest, and determine the pattern matching character string of which the number of products in the target store is the smallest, the number of products in the store group is the smallest, and the number of products in the store group is lower than or equal to the predetermined number, among the pattern matching character strings, as a product specific character string.

In this manner, the information processing server 10 functions as an example of a product specific character string determining means that determines the pattern matching character string of which the number of products in the target store is the smallest, the number of products in the store group is the smallest, and the number of products in the store group is lower than or equal to the predetermined number, among the one or more pattern matching character strings, as the product specific character string.

Next, the information processing server 10 determines whether or not the number of products in the target store is two or more (step S16). Specifically, the system control unit 14 determines whether or not the number of products in the target store corresponding to the determined product specific character string is two or more. That is, the system control unit 14 determines whether or not the smallest number of the products in the target store is two or more.

For example, when the model number of the target product is separated by a space symbol like the character strings "ABC-100 BK", "ABC-100 WH", "ABC-100 BL", and "ABC-100 RD", the narrowed down matching character string can be the character string "ABC-100", and thus a product webpage of a product stated by the character string "ABC-100 BK", a product webpage of a product stated by "ABC-100 WH", and so on are hit. Thus, the smallest number of products in the target store becomes two or more. There is also a case where the same product is sold in different product pages for a package of one and a package of twelve, or the like, in the same store. Thus, the smallest number of products in the target store is not limited to one, and can be two or more.

When the number of products in the target store is not two or more (step S16; NO), the information processing server 10 terminates the processing.

When the number of products in the target store is two or more (step S20; YES), the information processing server 10 extracts different character strings which are different from each other between the target product information pieces on the target products corresponding to the product specific character string, from the products in the target store (step S16). For example, the information processing server 10 compares the character strings of the product webpages of the products specified by the product specific character string "ABC-100" with each other, and extracts different character strings that are different from each other on the product webpages of the products. In particular, the information processing server 10 extracts character strings before and after the product specific character string "ABC-100" on the product webpages of the products, and extracts the different character strings "BK", "WH", "BL", "RD", and so on that are different from each other.

Incidentally, the information processing server 10 may compare character strings of only the product titles of the products specified by the product specific character string "ABC-100", and extract different character strings that are different from each other in the product titles of the products. In this case, the range of comparison is limited to the product titles, thus resulting in easier extraction of appropriate different character strings. Further, when pattern matching character strings are extracted from the product title in step S11, the targets of extraction of a pattern matching character string and a different character string are the same product title, thus resulting in easier extraction of appropriate different character strings.

Alternatively, the information processing server 10 may extract character strings only before or after the product specific character string "ABC-100" on the webpages of the products as different character strings. Information on the products of the same series (such as products in different colors, products in different volumes, or the like) in each store is entered by the same person, and thus tends to be in the same form. That is to say, when character strings (different character strings) showing differences between products in different colors such as "BK", "WH", "BL", and "RD", between products in different volumes, or the like are excluded, the other character strings tend to be the same. Further, these different character strings tend to appear in the same position with respect to the product specific character string such as that just in front of or just behind the product specific character string, thus resulting in easier extraction of appropriate different character strings.

Here, as a way of extracting different character strings, the information processing server 10 extracts character strings separated by a space or the like from each product title searched out by the product specific character string. Then, the information processing server 10 generates a set in which these character strings are collected for each product title. For example, the set { ..., "○○", "ABC-100", "BK", "ΔΔ", ... }, the set "{ ..., "○○", "ABC-100", "WH", "ΔΔ", ... }, and others are generated. Then, the information processing server 10 finds the product set (set { ..., "○○", "ABC-100", "ΔΔ", ... } or the like) of the set of the character strings of each product title. The information processing server 10 excludes this product set from the sets of the character strings of the product titles to find different character strings "BK", "WH", and others. Incidentally, the information processing server 10 may find different character strings by applying a condition that a character string is just behind a product specific character string to the sets of the character strings obtained after excluding the product set from the sets of the character strings of the product titles.

In this manner, when the number of products in the target store is two or more on the determined product specific character string, the information processing server 10 functions as an example of a different character string extracting means that extracts different character strings that are different from each other between target product information pieces on target products corresponding to the product specific character string.

Next, the information processing server 10 generates a combined-character string (step S21). Specifically, the system control unit 14 generates a combined-character string ("ABC-100 BK", "ABC-100 WH", and others) in which the product specific character string ("ABC-100") of which the number of products in the target store is two or more is combined with the different character strings ("BK", "WH", and others).

Incidentally, the information processing server 10 may generate, as a combined-character string, the character string "ABC-100-BK", the character string "ABC-100/BK", or the like. Because of fluctuations in expression or typos, there may be the character string "ABC-100-BK" or the character string "ABC-100/BK" instead of the character string "ABC-100 BK."

In this manner, the information processing server 10 functions as an example of a combined-character string generating means that generates a combined-character string in which the product specific character string of which the number of products in the target store is two or more is combined with the different character strings.

Next, the information processing server 10 finds the number of products in the target store hit in the target store with the combined-character strings as search keywords (step S22). Specifically, with each of the generated combined-character strings as a search keyword, referring to the product information DB 12a, the system control unit 14 finds the number of products in the target store of products hit in the target store, based on the store ID of the target product.

In this manner, the information processing server 10 functions as an example of a searching combined-character string in target store means that finds the number of products in the target store, with the generated combined-character strings as search keywords.

Next, when the number of products in the target store is one, the information processing server 10 determines the combined-character string as a second product specific character string (step S23). Then, the information processing server 10 stores the determined second product specific character string and the different character string corresponding to the second product specific character string in the product information DB 12a. Incidentally, the second product specific character may be stored in the product information DB 12a in place of a product specific character previously determined and stored, or may be stored as a second product specific character string in addition to a product specific character previously determined and stored.

By generating the character string "ABC-100-BK", the character string "ABC-100/BK", and others as combined-character strings, and finding a second product specific character string of which the number of products in the target store is one, fluctuations in expression and typos can be canceled.

In this manner, when the number of products in the target store by the searching combined-character string in target store means is one, the information processing server 10 functions as an example of a second product specific character string determining means that determines the combined-character string as a second product specific character string for specifying the target product.

When the number of products in the target store is not one, the information processing server 10 terminates the processing without determining a second product specific character string.

After the end of the above series of processing, processing through steps S10 to S23 is performed on a next target product of which a product specific character string is not determined.

Incidentally, after the determination of a product specific character string of each product, the information processing server 10 may construct a database, based on the product specific character strings, for example, to allow comparison between the products.

Figure 13:
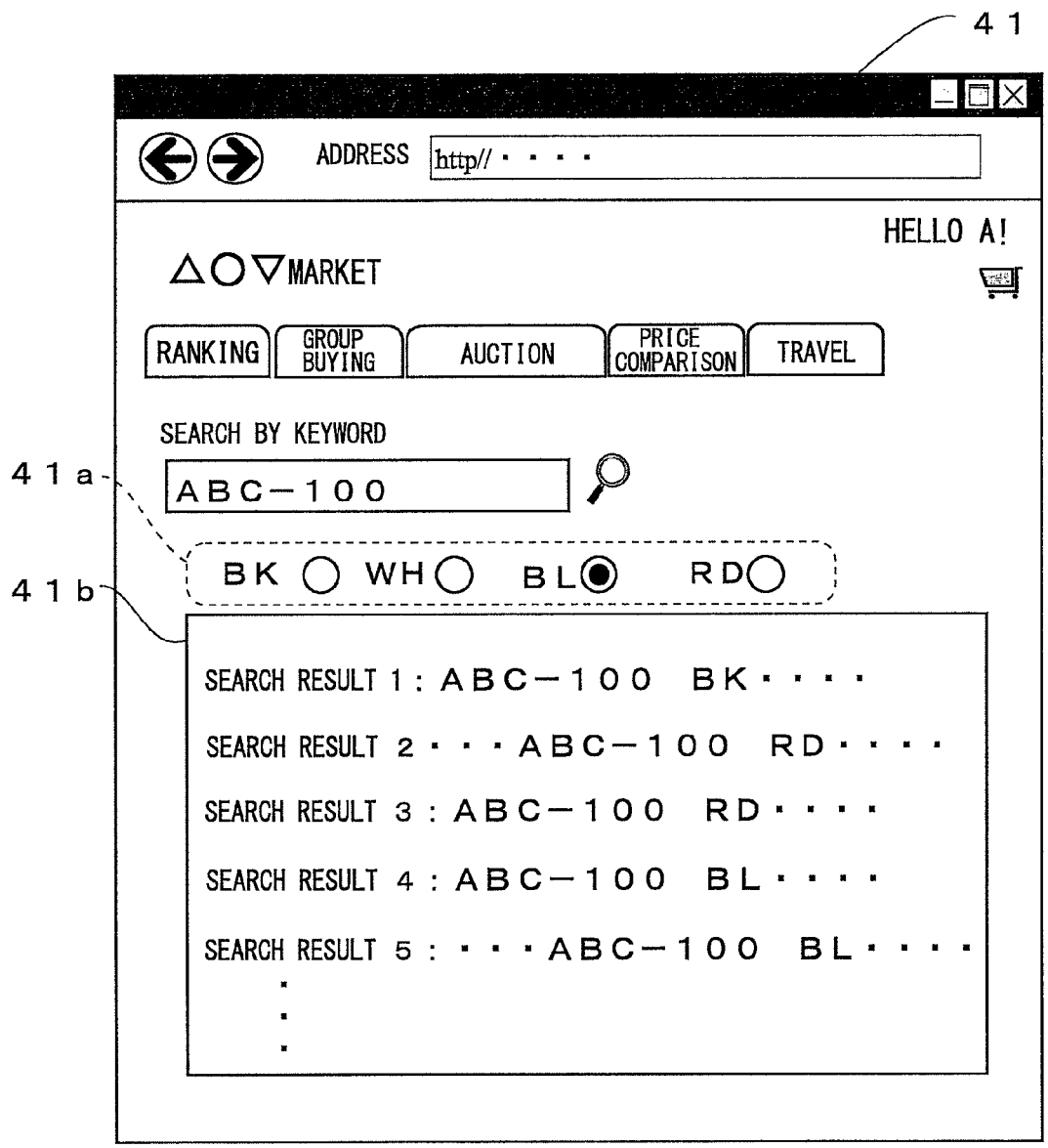
FIG. 13 is a schematic diagram illustrating an example of a webpage of search results generated in FIG. 11.
Figure 14:
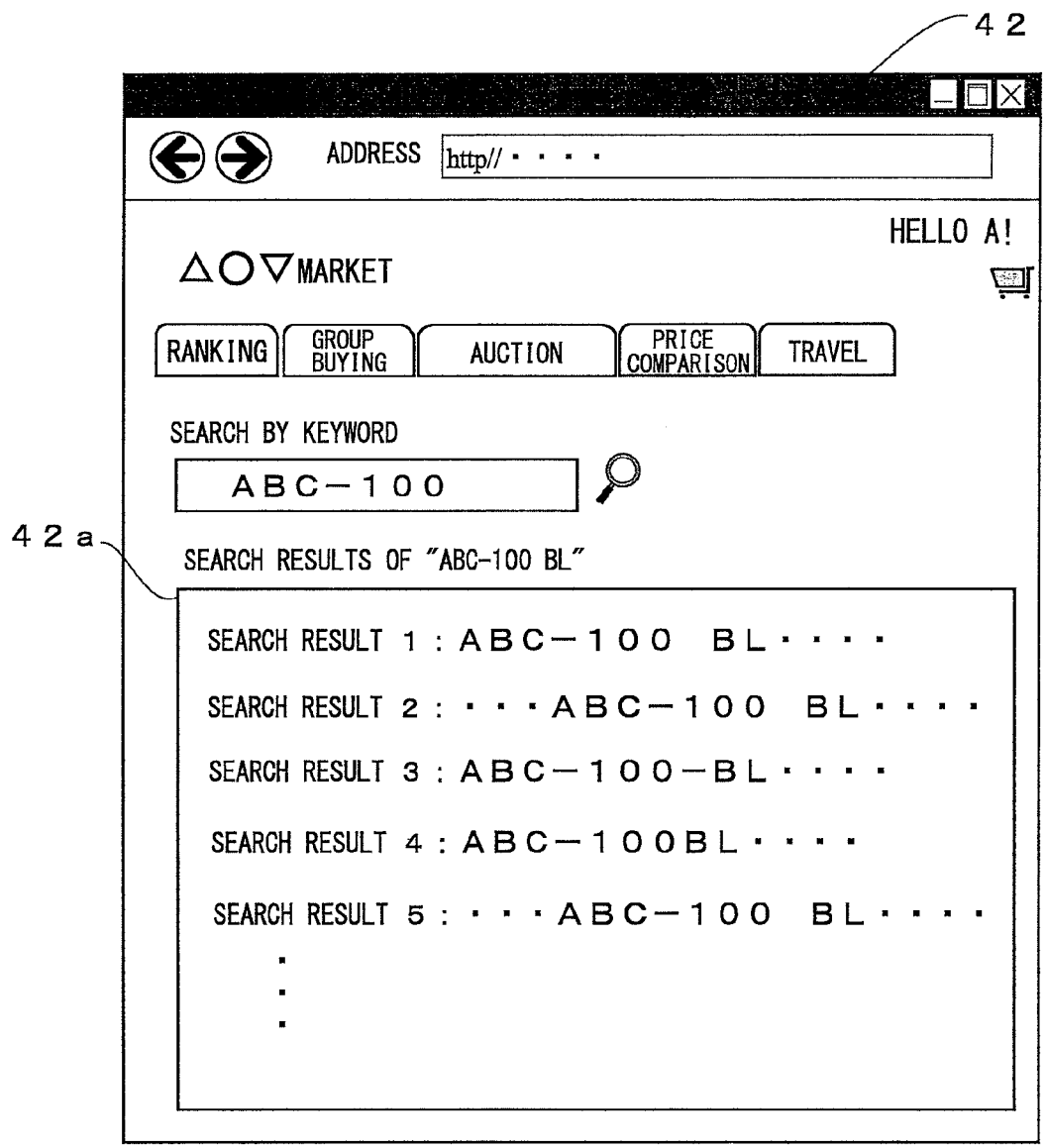
FIG. 14 is a flowchart showing an example of an operation of generating a webpage of search results on the information processing server in FIG. 1.

3.3 Operation Example of Generating Webpage of Search Results on Information Processing Server Next, an operation example of generating a webpage of search results on the information processing server will be described with reference to FIGS. 12 to 14.

Figure 12:
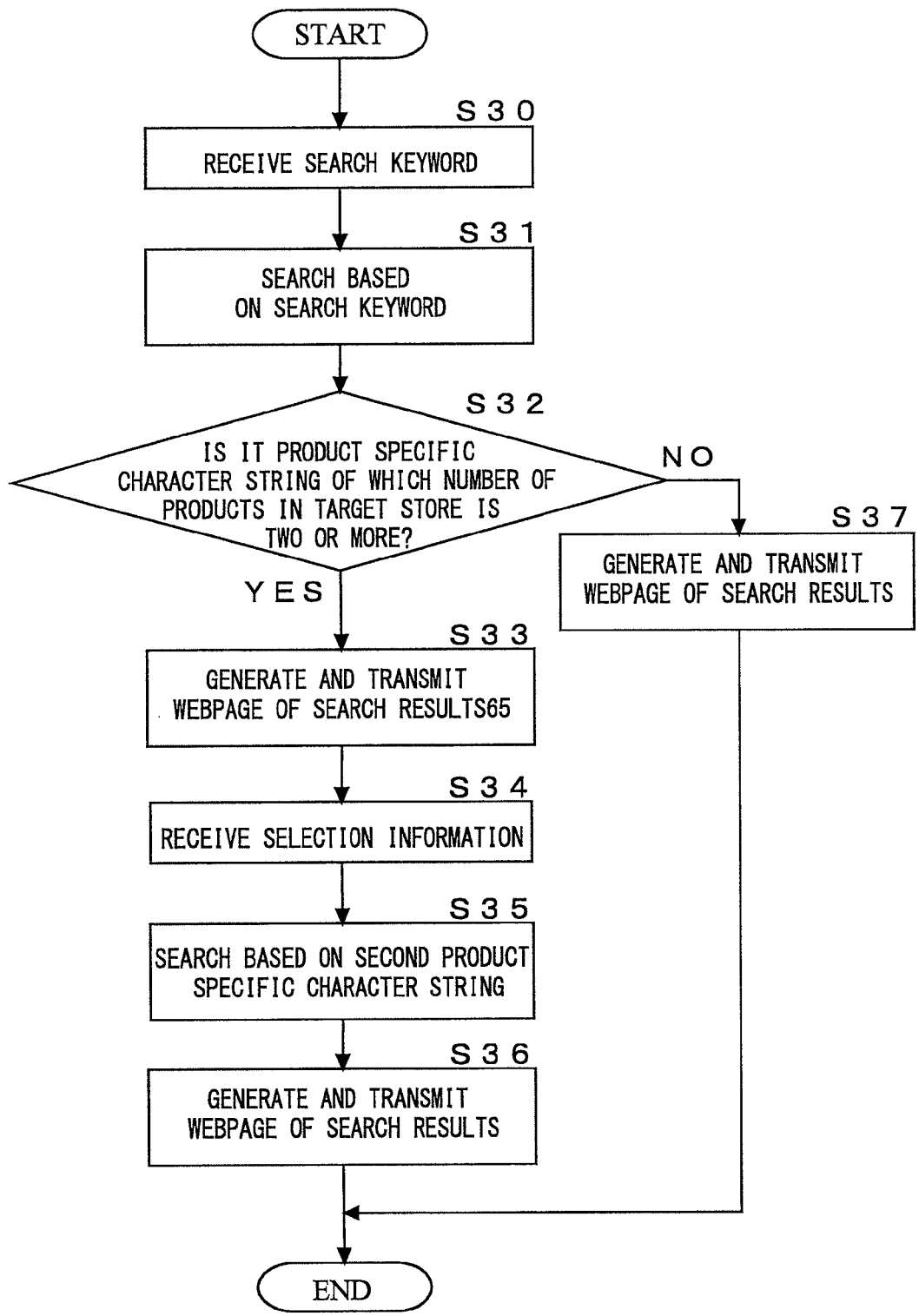
FIG. 12 is a flowchart showing an example of an operation of generating a webpage of search results on the information processing server in FIG. 1.

FIG. 12 is a flowchart showing an operation example of generating a webpage of search results on the information processing server 10. FIG. 13 is a schematic diagram illustrating an example of a generated webpage of search results. FIG. 14 is a flowchart showing an operation example of generating a webpage of search results on the information processing server 10.

For example, on a user terminal device 30, a user enters a search keyword to perform a product search. For example, the user enters the search word "ABC-100", which is the model number of a product. Then, the user terminal device 30 transmits a search query including the entered search word to the information processing server 10.

As shown in FIG. 12, the information processing server 10 receives the search keyword from the user terminal device 30 (step S30).

In this manner, the information processing server 10 functions as an example of a search keyword acquiring means that acquires a search keyword from a terminal device.

Next, the information processing server 10 performs a search, based on the search keyword (step S31). For example, the information processing server 10 performs a search by the search word "ABC-100" on all products on the market (in a store group), referring to the product information DB 12a. At that time, the number of products in one store is also stored together.

Next, the information processing server 10 determines whether or not it is a product specific character string of which the number of products in a target store is two or more (step S22). For example, the information processing server 10 determines whether or not the search word "ABC-100" is a product specific character string, referring to the box of the product specific character string in the product information DB 12a. When the search word corresponds to a product specific character string, the information processing server 10 determines whether or not there is a second product specific character string corresponding to the product specific character string, referring to the product information DB 12a. Alternatively, the information processing server 10 determines whether or not there is a different character string corresponding to the product specific character string, referring to the product information DB 12a. Incidentally, when there is a second product specific character string, the number of products in the target store is two or more.

When it is a product specific character string of which the number of products in the target store is two or more (step S32; YES), the information processing server 10 generates and transmits a webpage of search results (step S33). For example, as shown in FIG. 13, when there is a product specific character string corresponding to the search word "ABC-100", and there are second product specific character strings corresponding to this product specific character string, the information processing server 10 reads different character strings "BK", "WH", "BL", and "RD" corresponding to the product specific character string from the product information DB 12a, and generates a webpage 41 of search results including a different character string selection display 41a on which the user can select the different character string "BK", "WH", "BL", or "RD". The information processing server 10 transmits information on the webpage 41 to the user terminal device 30.

Incidentally, in search results 41b on the webpage 41, products including "ABC-100 BK", "ABC-100 BL", and so on are mixed.

In this manner, when the acquired search keyword is a product specific character string of which the number of products in the target store is two or more, the information processing server 10 functions as an example of a webpage generating means that generates a webpage on which the different character strings are displayed in a selectable manner for performing a search by the second product specific character string, and a transmitting means that transmits the webpage to the terminal device.

Next, the user terminal device 30 displays the webpage 41 on the display unit 33. The user selects one of the different character strings in the different character string selection display 41a by a radio button or the like. For example, the character string "BL" is selected. Then, the user terminal device 30 transmits selection information on the selected different character string to the information processing server 10.

Next, the information processing server 10 receives the selection information on the selected different character string from the user terminal device 30 (step S34).

In this manner, the information processing server 10 functions as an example of a selected information acquiring means that acquires information that the different character string is selected from the terminal device.

Next, the information processing server 10 performs a search, based on the second product specific character string (step S35). Specifically, the system control unit 14 performs a search, based on the second product specific character string in which the product specific character string and the different character string are combined. When the selected different character string is the character string "BL", a search by the search word "ABC-100 BL" is performed with reference to the product information DB 12a.

Next, the information processing server 10 generates and transmits a webpage of search results (step S36). For example, as shown in FIG. 14, the information processing server 10 generates a webpage 42 of the search results. Incidentally, on search results 42a of the webpage 42, the search results of products of "ABC-100 BL" only are displayed.

In this manner, when the different character string is selected, the information processing server 10 functions as an example of a search result transmitting means that transmits the search results searched out by the second product specific character string including the selected different character string to the terminal device.

When it is not a product specific character string of which the number of products in the target store is two or more (step S32; NO), the information processing server 10 performs a search, based on the search word "ABC-100", and generates and transmits a webpage of the search results to the user terminal device 30 (step S37).

As above, according to this embodiment, from among pattern matching character strings that have narrowed down to some extent in target product information on a target product, the number of products in a target store is narrowed to the smallest, so that the product specific character string determined becomes a character string with the highest ability of specifying the target product in the target store. Since it is often that one product webpage is usually assigned to one product in one store, a product specific character string determined under the condition that the number of products in the target store be the smallest, based on pattern matching character strings extracted from a product webpage of the target product is highly likely to be a unique character string corresponding to the product webpage of the target product.

Even when it is impossible to narrow down by a predetermined pattern such as a regular expression, it is possible to find a product specific character string with a high specifying precision in easily specifying a target product, under the condition that the number of products in a target store be the smallest.

Further, in step S12, a character string including a predetermined character string with a low possibility of being a product specific character string is excluded, with reference to the dictionary DB 12d, in pattern matching character strings matching a predetermined pattern, so that the specifying precision in specifying a target product is further improved.

Further, when the number of products in a store group to which a target store belongs, of products hit in the range of store group product information on products sold in the store group is found for each pattern matching character string with each of pattern matching character strings as a search keyword, and among the one or more pattern matching character strings, a pattern matching character string of which the number of products in the target store is the smallest, and the number of products in the store group is lower than or equal to a predetermined number is determined as a product specific character string, the determined product specific character string, of which the number of products in the store group in the store group is lower than or equal to the predetermined number, is thus a character string that is not used relatively also in the other stores, and, as a unique character string, facilitates specifying the target product also in the store group, and has high suitability as a product specific character string. Thus, a product specific character string with a higher specifying precision in specifying a target product can be found.

Further, when the number of products in the store group is lower than or equal to a predetermine number that is two or more, it is a character string used also in stores other than one's store, so that it becomes a product specific character string by which comparison of products with those in the other stores is possible.

Here, when a product information file is created on the store terminal devices 20, a product ID may be entered as product information together with a product name, a price, a product explanation, and others. A product ID can be determined uniquely by one's store to distinguish products in the one's store in each store. Thus, when a product ID that is determined uniquely by one's store and is not used in other stores is extracted as a pattern matching character string, the number of products in the store group is one. When the number of products in the store group is one, the character string is unique only in the target store, but is a character string that is not used at all in the other stores, and is a character string that cannot be a key for comparison between products sold in various stores.

Incidentally, among pattern matching character strings, a pattern matching character string of which the number of products in a target store is the smallest, and the number of products in a store group is the smallest may be determined as a product specific character string for specifying a target product. In this case, the number of products in a target store is the smallest, and in addition, the number of products in a store group is the smallest, thus the product specific character string becomes a character string with the highest ability of specifying the target product even in a shopping site, so that the specifying precision in specifying a target product is further improved.

Further, when, among pattern matching character strings, a pattern matching character string of which the number of products in a target store is the smallest, the number of products in a store group is the smallest, and the number of products in the store group is lower than or equal to a predetermined number is determined as a product specific character string for specifying a target product, since the number of products in the store group is the smallest, so that the specifying precision in specifying a target product is further improved.

When the number of products in a target store is two or more on a product specific character string determined, different character strings different from each other between target product information pieces on target products corresponding to the product specific character string are extracted (S20), combined-character strings in which the product specific character string of which the number of products in the target store is two or more is combined with the different character strings are generated (S21), the number of products in the target store is found with each generated combined-character string as a search keyword (S22), when the number of products in the target store is one, the combined-character string is determined as a second product specific character string for specifying the target product (S23). In this case, when there is a similar product specific character string, a second product specific character string improved in specifying precision in specifying the target product more than the product specific character string can be obtained. Moreover, even when there are fluctuations in expression or typos, a second product specific character string in which the fluctuations in expression or typos are cancelled can be obtained.

Further, a search keyword is acquired from the user terminal device 30 (S30), and when the acquired search keyword is a product specific character string of which the number of products in a target store is two or more, a webpage 41 displayed in such a manner that a different character string can be selected to perform a search by a second product specific character string is generated, and the webpage 41 is transmitted to the user terminal device 30 (S33), information on the selection of the different character string is acquired from the user terminal device 30 (S34), and when the different character string is selected, search results searched out by the second product specific character string including the selected different character string are transmitted to the user terminal device 30 (S35, S36). In this case, since the different character strings are displayed in a selectable manner and a search is performed by the second product specific character string including the selected different character string, so that a user can further narrow down products by the second product specific character string, thus the user can make a search without entering a model number or the like in detail, and user convenience is improved.

3.4 Modifications

A store group is not limited to an entire shopping site, but may be an area corresponding to the addresses of stores, or a category of products sold by stores (such as a group of food-related stores, a group of electricity-related stores, a group of miscellaneous goods-related stores, or the like). Further, a store group may be a store group in accordance with a level of a product category, a rank of products sold by stores, or the like.

Further, the scope of search is not limited to the shopping site of the information processing server 10, but may be the entire network 3.

Further, product categories may have a hierarchical structure. For example, the first category "home appliances/personal computers/communications", the second category "personal computers/peripherals", the third category "accessories" are included. Alternatively, the first category "fashion", the second category "ladies' fashion", the third category "one-pieces", the fourth category "sleeveless" and so on are included. The first category "Japan", the second category "Kanto region", the third category "Tokyo Metropolis", the fourth category "in 23 wards", and so on are included. An upper category contains a lower category.

Store groups are formed in accordance with such categories. That is, store groups form store groups in a plurality of levels having a hierarchical structure.

In step S14, the information processing server 10 may find the number of products in a store group corresponding to a store group in each level of a category, with each of pattern matching character strings as a search keyword. Based on each level in a hierarchy of categories, a store ID, and a category ID, the range of a store group in each level of the categories is specified.

In this manner, the information processing server 10 functions as an example of a searching in store group means that finds the number of products in a store group corresponding to a store group in each level for each pattern matching character string.

Next, in step S15, the information processing server 10 determines, as a product specific character string, a pattern matching character string of which the number of products in a store group in an upper level and the number of products in a store group in a lower level in store groups in respective levels satisfy a predetermined condition. For example, when a narrowed down pattern matching character string is a brand name or the like (provided that in step S12, a brand name has not been excluded), the number of products in a store group in each category is likely to change rapidly as the level of the category becomes lower. For example, the number of products in a store group changes rapidly from a first category to a second category (between predetermined categories) like, in the first category "home appliances/personal computers/communications", 150, in the second category "personal computers/peripherals", 50, and in the third category "accessories", 35.

On the other hand, for a model number, since a model number uniquely indicates a product, the number of products in a store group is likely to change slowly even when the level of categories becomes lower. For example, it changes slowly like, in the first category "home appliances/personal computers/communications", 150, in the second category "personal computers/peripherals", 140, and in the third category "accessories", 130.

Thus, an example of the predetermined condition for the number of products in a store group in an upper level and the number of products in a store group in a lower level may be that the number of products in a store group in a level lower by one level decrease by a predetermined percent or less on the basis of the number of products in a store group in a level upper by one level.

Incidentally, when an area is set as a category, the number of products in a store group is likely to change in proportion to the number of stores located in an area in each level.

Further, the predetermined number may be a predetermined number in accordance with an aspect of a store group.

For example, an example of an aspect of a store group may be the size of the store group (the number of stores in the store group, the number of products sold in the entire store group, or the like), the kind of products sold by stores in the store group, the category to which a target store belongs, or the like. When the size of a store group is large, the predetermined number is increased compared with when the size of the store group is small. For a category in an upper level, since the number of stores present in the store group increases, the predetermined number is increased. For a store group of stores selling a popular product, the predetermined number is increased.

In this case, the predetermined number is determined in accordance with the aspect of the store group, so that it becomes a predetermined number appropriate for the aspect of the store group, resulting in a further improved specifying precision in specifying a target product.

In particular, the predetermined number may be the number of stores in a group (or a number in accordance with the number of stores) or less. When the number of products in a store group is larger than the number of stores in the group, the pattern matching character string is used two or more times in a store somewhere and weakened in the specifying ability, and has a lower possibility of being a product specific character string such as a model number.

Further, the present invention is not limited to the above-described embodiments. The above-described embodiments are illustrative, and any of those having a structure substantially identical to the technical idea described in the claims of the present invention and having similar functions and effects is included in the technical scope of the present invention.

EXPLANATION OF REFERENCE NUMERALS 1 information processing system
3 network
10 information processing server (information processing device)
12 storage unit
12a product information DB
12d dictionary DB
20 store terminal device
30 user terminal device (terminal device)
41, 42 webpage

The invention claimed is:

1. An information processing device comprising:
at least one memory operable to store program code; and
at least one processor operable to access said memory and read said program code and operate as instructed by said program code, said program code including:
character string extracting code configured to cause at least one of said at least one processor to extract at least one pattern matching character string matching a predetermined pattern from target product information on a target product in a target store;
searching in target store code configured to cause at least one of said at least one processor to find the number of products in the target store of products hit in a range of product information on products sold in the target store, with each pattern matching character string as a search keyword, for each pattern matching character string; and
product specific character string determining code configured to cause at least one of said at least one processor to determine, among the one or more pattern matching character strings, a pattern matching character string of which the number of products in the target store is the smallest, as a product specific character string for specifying the target product.

2. The information processing device according to claim 1, further comprising:
searching in store group code configured to cause at least one of said at least one processor to find the number of products in a store group to which the target store belongs, of products hit in a range of store group product information on products sold in the store group, with each pattern matching character string as a search keyword, for each pattern matching character string, wherein
the product specific character string determining code is further configured to cause at least one of said at least one processor to determine, among the one or more pattern matching character strings, a pattern matching character string of which the number of products in the target store is the smallest, and the number of products in the store group is lower than or equal to a predetermined number, as the product specific character string.

3. The information processing device according to claim 2, wherein
the product specific character string determining code is further configured to cause at least one of said at least one processor to determine, among the one or more pattern matching character strings, a pattern matching character string of which the number of products in the target store is the smallest, the number of products in the store group is the smallest, and the number of products in the store group is lower than or equal to the predetermined number, as the product specific character string.

4. The information processing device according to claim 2, wherein
the predetermined number is in accordance with an aspect of the store group.

5. The information processing device according to claim 2, wherein
the store group forms a store group in each level of a plurality of levels having a hierarchical structure;
the searching in store group code is further configured to cause at least one of said at least one processor to find the number of products in a store group corresponding to the store group in each level for each pattern matching character string; and
the product specific character string determining code is further configured to cause at least one of said at least one processor to determine a pattern matching character string of which the number of products in a store group in an upper level and the number of products in a store group in a lower level in the store groups in the respective levels meet a predetermined condition, as the product specific character string.

6. The information processing device according to claim 1, further comprising:
different character string extracting code configured to cause at least one of said at least one processor to extract different character strings different from each other between target product information pieces on target products corresponding to the determined product specific character string when the number of products in the target store is two or more on the product specific character string;
combined-character string generating code configured to cause at least one of said at least one processor to generate a combined-character string in which the product specific character string of which the number of products in the target store is two or more is combined with the different character strings;
searching combined-character string in target store code configured to cause at least one of said at least one processor to find the number of products in the target store, with the generated combined-character string as a search keyword; and
second product specific character string determining code configured to cause at least one of said at least one processor to determine the combined-character string as a second product specific character string for specifying the target product when the number of products in the target store is one.

7. The information processing device according to claim 6, further comprising:
search keyword acquiring code configured to cause at least one of said at least one processor to acquire a search keyword from a terminal device;
webpage generating code configured to cause at least one of said at least one processor to generate a webpage on which the different character strings are displayed in a selectable manner to perform a search by the second product specific character string when the acquired search keyword is the product specific character string of which the number of products in the target store is two or more;
transmitting code configured to cause at least one of said at least one processor to transmit the webpage to the terminal device;
selected information acquiring code configured to cause at least one of said at least one processor to acquire information on what a different character string is selected, from the terminal device; and
search result transmitting code configured to cause at least one of said at least one processor to, when the different character string is selected, transmit search results searched out by the second product specific character string including the selected different character string, to the terminal device.

8. An information processing method comprising:
extracting at least one pattern matching character string matching a predetermined pattern from target product information on a target product in a target store;
finding the number of products in the target store of products hit in a range of product information on products sold in the target store, with each pattern matching character string as a search keyword, for each pattern matching character string; and
determining, among the one or more pattern matching character strings, a pattern matching character string of which the number of products in the target store is the smallest, as a product specific character string for specifying the target product.

9. A non-transitory recording medium in which a program for an information processing device is computer-readably recorded, the program causing a computer to:
extract at least one pattern matching character string matching a predetermined pattern from target product information on a target product in a target store;
find the number of products in the target store of products hit in a range of product information on products sold in the target store, with each pattern matching character string as a search keyword, for each pattern matching character string; and
determine, among the one or more pattern matching character strings, a pattern matching character string of which the number of products in the target store is the smallest, as a product specific character string for specifying the target product.

* * * * *